(12) United States Patent
Zhou et al.

(10) Patent No.: US 8,756,313 B2
(45) Date of Patent: Jun. 17, 2014

(54) METHOD AND SYSTEM FOR NOTIFYING NETWORK RESOURCE UPDATES

(75) Inventors: Dakui Zhou, Beijing (CN); Zhi Gao, Beijing (CN)

(73) Assignee: Beijing Sogou Technology Development Co., Ltd., Beijing (CN)

( * ) Notice: Subject to any disclaimer, the term of this patent is extended or adjusted under 35 U.S.C. 154(b) by 111 days.

(21) Appl. No.: 13/300,569

(22) Filed: Nov. 19, 2011

(65) Prior Publication Data

US 2012/0066379 A1 Mar. 15, 2012

Related U.S. Application Data

(63) Continuation of application No. PCT/CN2010/074235, filed on Jun. 22, 2010.

(30) Foreign Application Priority Data

Jun. 23, 2009 (CN) .......................... 2009 1 0087502

(51) Int. Cl.
*G06F 15/173* (2006.01)
*G06F 17/30* (2006.01)
*H04L 29/08* (2006.01)

(52) U.S. Cl.
CPC .......... *G06F 17/30899* (2013.01); *H04L 67/26* (2013.01)

USPC ........................................................ 709/224

(58) Field of Classification Search
None
See application file for complete search history.

(56) References Cited

U.S. PATENT DOCUMENTS

| 8,386,427 | B2 * | 2/2013 | Collet et al. | 709/224 |
| 2004/0117479 | A1 * | 6/2004 | Jellum et al. | 709/224 |
| 2009/0171930 | A1 * | 7/2009 | Vaughan et al. | 707/5 |
| 2009/0210806 | A1 * | 8/2009 | Dodson et al. | 715/760 |

* cited by examiner

*Primary Examiner* — Thomas Dailey
*Assistant Examiner* — Nam Tran
(74) *Attorney, Agent, or Firm* — Anova Law Group, PLLC

(57) ABSTRACT

A method is disclosed for notifying a user of network resource updates for a terminal with a browser. The method includes identifying a plurality of network resources from multiple sources to be dynamically monitored and dynamically monitoring the identified network resources based on a trigger mechanism. The method also includes determining whether there are updates in the monitored network resources and, when it is determined that there are updates in the monitored network resources, notifying the user according to a preset update notification means and the multiple sources of updated network resources.

13 Claims, 3 Drawing Sheets

METHOD AND SYSTEM FOR NOTIFYING NETWORK RESOURCE UPDATES

CROSS-REFERENCES TO RELATED APPLICATIONS

This application claims the priority of PCT patent application no. PCT/CN2010/074235, filed on Jun. 22, 2010, which claims the priority of Chinese patent application no. 200910087502.1, filed on Jun. 23, 2009, the entire contents of all of which are incorporated herein by reference.

FIELD OF THE INVENTION

The present invention generally relates to the Internet technologies and, more particularly, to the methods and systems for notifying network resource updates.

BACKGROUND

With the popularity of the Internet, people are more and more used to obtaining information and searching documents through the Internet. Although there are a huge variety of portal websites becoming operational, it is rather time consuming to switch back and forth between various websites. The search engines may help us to search for anything we want, however, it is burdensome to perform proper searches. Now there is a new information format on the Internet, which is called RSS (Rich Site Summary or Really Simple Syndication). The RSS is an XML-format standard for users to share news headlines and other Web contents, and is also a widely-used content packaging and delivery protocol on the Internet. Using RSS syndicate software tools, Internet users can read contents from websites supporting the RSS output at the client side.

The Internet today has a massive number of websites, and the time when each website is updated is unpredictable. One way is that, through the favorites folder feature of existing conventional browsers, such as the IE browser, a user can store webpage links of those web pages that are interested by the user. Thus, next time when the user is browsing the Internet, the user can go directly to the favorites folder to search the stored webpage links, and further can click a link to read updated contents of a corresponding web page. The other way is that, through a client-side RSS reader, the user can subscribe those web pages that are interested by the user. When one or more websites have updated contents, the client-side RSS reader can automatically update an RSS list regularly, and also update titles of the websites in the RSS folder for the user to follow links and read contents. The user can also manually update the RSS list after starting the client-side RSS reader, and then search the RSS list for titles of updated websites to follow the links and read the contents.

However, to the best knowledge of the applicants, although the favorites-folder feature provided by one of the ways can be used with any web pages, the web pages stored in the favorites folder cannot be dynamically monitored; neither can a user be notified to visit a web page after the web page has been updated. Further, the client-side RSS reader software provided by the other way can only dynamically monitor those web pages supporting RSS output and often with very limited functionalities.

The disclosed methods and systems are directed to solve one or more problems set forth above and other problems.

BRIEF SUMMARY OF THE DISCLOSURE

One aspect of the present disclosure includes a method for notifying a user of network resource updates for a terminal with a browser. The method includes identifying a plurality of network resources from multiple sources to be dynamically monitored and dynamically monitoring the identified network resources based on a trigger mechanism. The method also includes determining whether there are updates in the monitored network resources and, when it is determined that there are updates in the monitored network resources, notifying the user according to a preset update notification means and the multiple sources of updated network resources.

Another aspect of the present disclosure includes a browser for notifying a user of network resource updates for a terminal. The browser includes a dynamic monitoring module and an update notification module. The dynamic monitoring module is configured to identify a plurality of network resources from multiple sources to be dynamically monitored, to dynamically monitor the identified network resources based on a trigger mechanism, and to determine whether there are updates in the monitored network resources. Further, the update notification module is configured to notify the user according to a preset update notification means and the multiple sources of updated network resources when the dynamic monitoring module determines that there are updates in the monitored network resources.

Another aspect of the present disclosure includes a computer-readable medium containing executable computer programs. When executed by a computer terminal having a browser, the computer programs perform a method for notifying a user of network resource updates. The method includes identifying a plurality of network resources from multiple sources to be dynamically monitored and dynamically monitoring the identified network resources based on a trigger mechanism. The method also includes determining whether there are updates in the monitored network resources and, when it is determined that there are updates in the monitored network resources, notifying the user according to a preset update notification means and the multiple sources of updated network resources.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. For convenient purposes, certain terms used in this disclosure are explained first.

The term "HTML," or HyperText Markup Language, is currently the most widely used language on the Internet, and is also a main language for webpage documents. Certain other languages may also be used in place of HTML.

The term "DOM," Document Object Model, refers a browser, platform, and language-neutral interface that can be used to access other standard components of web pages. Certain other interfaces may also be used.

The term "network resource," as used herein, refer to any resource that can be identified and analyzed by a browser and its plug-ins, such as web pages, videos, audios, and pictures, etc.

The term "specific content," as used herein, refer to any information in a network resource interested by a user. Specific content may include part or all of the information in the network resource. It is understood that, because of the ever-changing forms of network resources, the standard for the specific content(s) may be flexible. As long as interested by the user, any content can be considered as the specific content of a network resource. For example, if a user is interested in an advertisement at a certain location of a certain network resource, such advertisement can also be considered as the specific content of the certain network resource, while, in general, HTML tag sets and large amount of advertisements and navigation information in network resources are considered as non-specific contents.

A "specific element" may refer any element of a network resource or a collection of multiple elements, and the multiple elements may be presented in different forms, e.g., in a discrete form or in a contiguous form.

A "specific area" may refer any area of the network resource or multiple areas of the network resource.

The specific area and the specific element are two ways to extract or capture specific contents. That is, by obtaining specific areas of the network resource, the contents of the specific areas can be obtained as the specific contents of the network resource; or by obtaining specific elements of the network resource, the contents of the corresponding specific elements can be obtained as the specific contents of the network resource. When a specific area is a single area in the network resource and the area is small enough as only fitting one element, the specific area is equivalent to a specific element in the network resource. On the other hand, when a specific element is a collection of multiple elements contiguously formed together into an area, the specific element is equivalent to a specific area.

Figure 5:
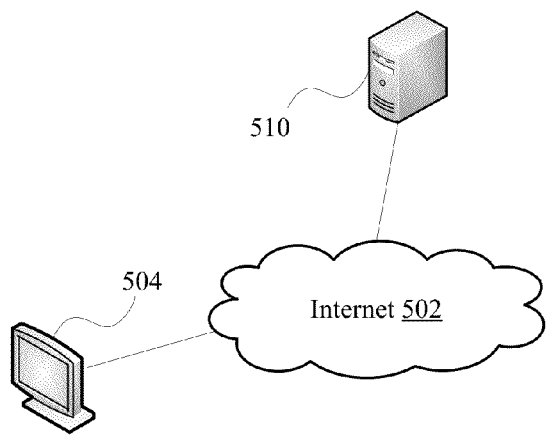
FIG. 5 illustrates an exemplary network environment incorporating certain aspects of the disclosed embodiments.

FIG. 5 illustrates an exemplary network environment incorporating certain aspects of the disclosed embodiments. As shown in FIG. 5, network environment 500 may include the Internet 502, a user computer 504, and a server 510. Other components may be added and certain devices may be removed without departing from the principles of the disclosed embodiments.

The Internet 502 may include any private and public computer networks interconnected using the standard transport control protocol/internet protocol (TCP/IP). Internet 502 may connect a large number of network resources.

Figure 6:
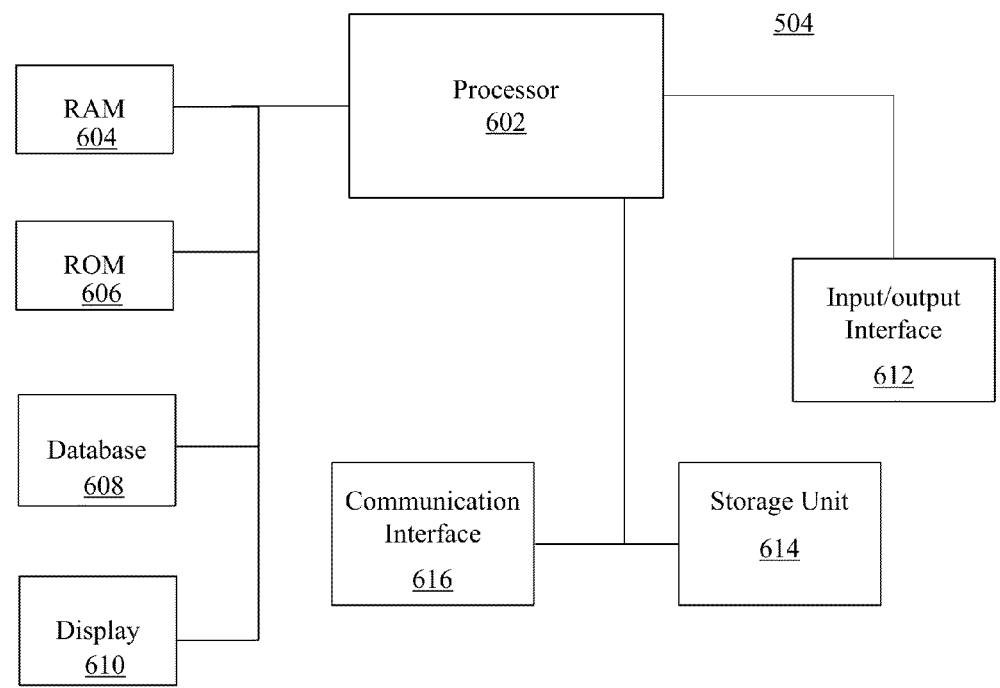
FIG. 6 illustrates a block diagram of an exemplary user computer consistent with the disclosed embodiments.

Server 510 may include any appropriate computer servers, software, and databases so as to provide various websites and web pages. Further, user computer 504 may include any appropriate types of computers operated by a user or users to access web-based or local network resources. For example, user computer 504 may include a desktop computer, a notebook computer, a tablet, a smart phone, and other types of computing platforms and software programs. FIG. 6 shows a block diagram of an exemplary user computer 504.

As shown in FIG. 6, user computer 504 may include a processor 602, a random access memory (RAM) unit 604, a read-only memory (ROM) unit 606, a database 608, a display 610, an input/output interface unit 612, a storage unit 614, and a communication interface 616. Other components may be added and certain devices may be removed without departing from the principles of the disclosed embodiments.

Processor 602 may include any appropriate type of graphic processing unit (GPU), general-purpose microprocessor, digital signal processor (DSP) or microcontroller, and application specific integrated circuit (ASIC), etc. Processor 602 may execute sequences of computer program instructions to perform various processes associated with user computer 504. The computer program instructions may be loaded into RAM 604 for execution by processor 602 from read-only memory 606.

Database 608 may include any appropriate commercial or customized database to be used by user computer 504, and may also include query tools and other management software for managing database 608. Display 610 may include any appropriate computer monitor, such as an LCD monitor. Further, input/output interface 612 may be provided for a user or users to input information into user computer 504 or for the user or users to receive information from user computer 504. For example, input/output interface 612 may include any appropriate input device, such as a remote control, a keyboard, a mouse, a microphone, a video camera or web-cam, an electronic tablet, voice communication devices, or any other optical or wireless input devices. Input/output interface 612 may include any appropriate output device, such as a speaker, or any other output devices.

Storage unit 614 may include any appropriate storage device to store information used by user computer 504, such as a hard disk, a flash disk, an optical disk, a CR-ROM drive, a DVD or other type of mass storage media, or a network storage. Further, communication interface 616 may provide communication connections such that user computer 504 may be accessed remotely and/or communicate with other systems through computer networks or other communication networks via various communication protocols, such as TCP/IP, hyper text transfer protocol (HTTP), etc.

Figure 3:
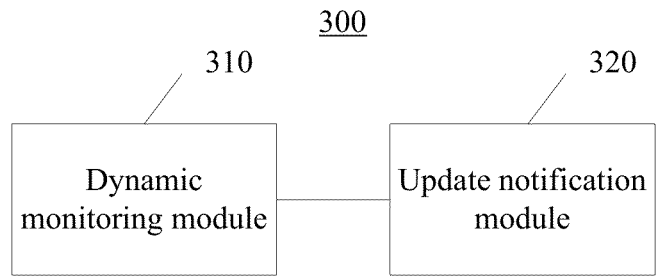
FIG. 3 illustrates an exemplary block diagram of a network resource update notification system consistent with the disclosed embodiments.

Returning to FIG. 5, user computer 504 may access various network resources from server 510 or other servers through Internet 502 or from local storages. A network resource update notification system may be implemented on user computer 504 to facilitate user or users to access network resources and to be notified actively and timely about any updates in the network resources interested by the user or user. FIG. 3 illustrates an exemplary block diagram of a network resource update notification system 300.

As shown in FIG. 3, system 300 includes a dynamic monitoring module 310 and an update notification module 320. Other components may also be included. Further, system 300 may be implemented using certain software, hardware, or a combination of hardware and software within user computer 504. For example, system 300 may be implemented by a browser according to disclosed embodiments.

Figure 4:
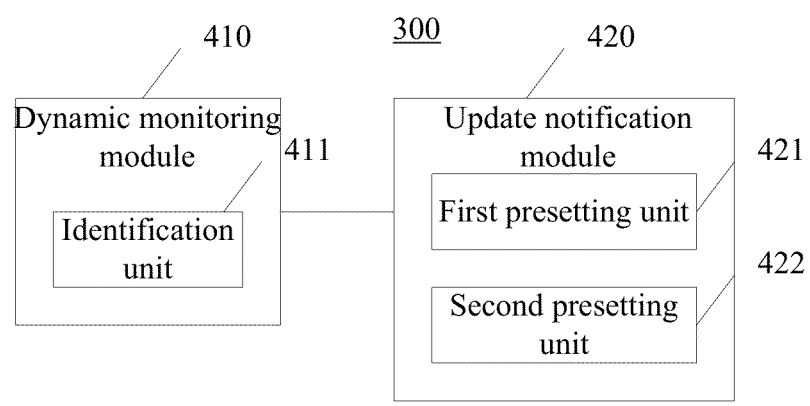
FIG. 4 illustrates a more detailed exemplary block diagram of a network resource update notification system consistent with the disclosed embodiments.

Dynamic monitoring module 310 may be configured to dynamically monitor network resources, and update notification module 320 may be configured to notify the user according to a preset update notification means when dynamic monitoring module 310 detects updating from the monitored network resources. FIG. 4 illustrates a more detailed exemplary block diagram of a network resource update notification system 300.

As shown in FIG. 4, system 300 includes a dynamic monitoring module 410 and an update notification module 420. Similar to dynamic monitoring module 310, dynamic monitoring module 410 may also be configured to dynamically monitor network resources; and, similar to update notification module 320, update notification module 420 may be configured to notify the user according to a preset update notification means when dynamic monitoring module 410 detects updating from the monitored network resource.

Further, dynamic monitoring module 410 may include an identification unit 411. Identification unit 411 may be configured to identify the network resources to be dynamically monitored. More particularly, identification unit 411 may identify the network resources to be dynamically monitored based on one or more instructions specifying network resources that need to be dynamically monitored received from the user, or identification unit 411 may identify the network resources to be monitored based on analysis by system 300 using preset rules.

Dynamic monitoring module 410 may dynamically monitor the network resources identified by identification unit 411 using any appropriate algorithms. For example, dynamic monitoring module 410 may take consecutive snapshots of a same network resource and compare the contents of the consecutive snapshots. If the contents are considered as different contents, dynamic monitoring module 410 may determine that the network resource is updated.

Update notification module 420 may include a first presetting unit 421 and a second presetting unit 422. The first presetting unit 421 may be configured to preset or pre-configure one or more update-notification conditions. The update-notification conditions are used to determine whether a certain change or update from a network resource should be notified to the user. The update-notification conditions may include any appropriate conditions.

For example, the update notification condition may includes one or more of followings: the total number of changed words in the network resource exceeds a certain threshold value, the changed portion in the network resource contains picture(s) (picture changes), the changed portion in the network resource contains link(s) (link changes), the changed portion in the network resource contains key word (s), the changed portion in the network resource contains multi-media file(s), and/or the changed portion in the network resource contains downloadable file(s) (such as RAR files, etc.), etc. Other conditions may also be used.

The second presetting unit 422 may be configured to preset the update-notification means to be used to notify the user of any updates from the network resources being dynamically monitored. The second presetting unit 422 may be configured to preset the update-notification means based on one or more received user configuration instructions, or to preset the update-notification means automatically. Further, the update-notification means may include any appropriate means to notify the user of the network resource updates through different components, such as input/output interface 612, communication interface 616, and/or display 610.

Figure 1:
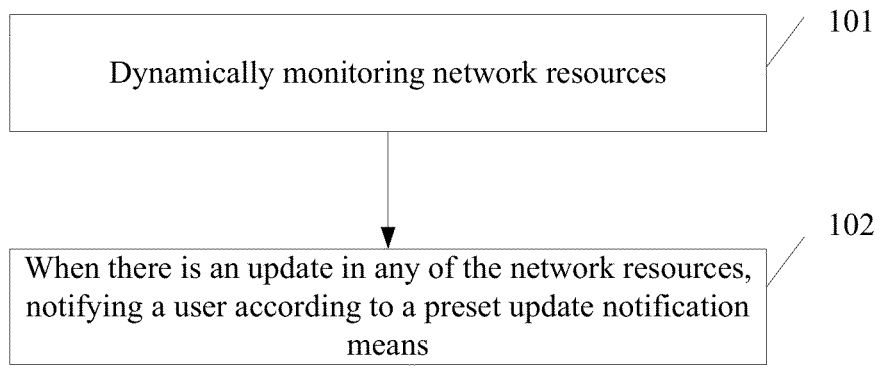
FIG. 1 illustrates an exemplary operational process consistent with the disclosed embodiments.

After the dynamic monitoring module 410 detects an update from a network resource, update notification module 420 may test the preset update-notification condition (e.g., set by the first presetting unit 421) and may notify the user according to the preset update-notification means (e.g., set by the second presetting unit 422). More particularly, in operation, system 300 (e.g., dynamic monitoring module 410 and update notification module 420) may perform certain operational processes to implement network resource update notification functionalities. FIG. 1 illustrates an exemplary operational process of system 300 (e.g., dynamic monitoring module 410 and update notification module 420) consistent with the disclosed embodiments.

Figure 2:
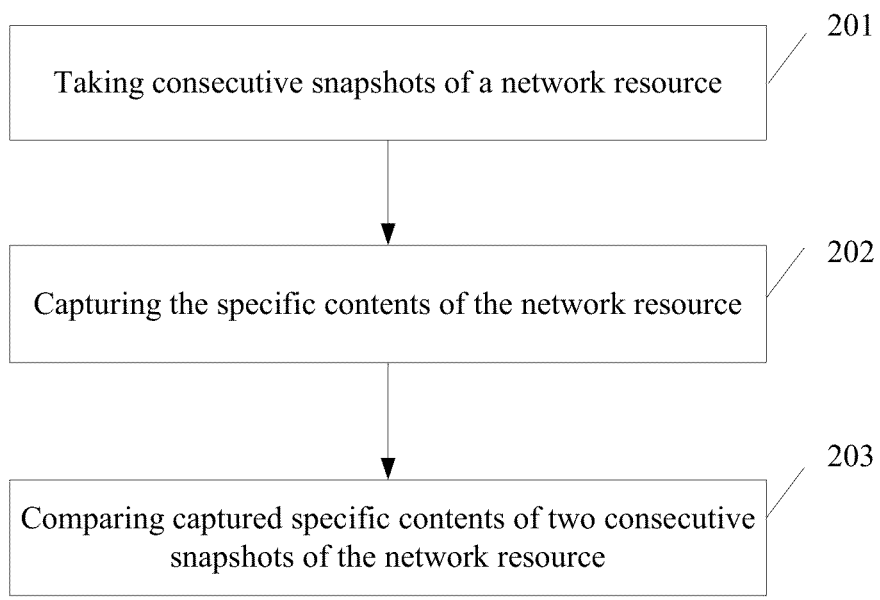
FIG. 2 illustrates exemplary details of a dynamic monitoring process consistent with the disclosed embodiments.

As shown in FIG. 1, at beginning, system 300 (e.g., a browser) may dynamically monitor a network resource or a plurality of network resources (101). More particularly, the browser (e.g., dynamic monitoring module 410) may dynamically monitor corresponding update information of the network resource by taking snapshots (i.e., capturing contents at a certain point of time) of a same network resources and comparing the contents of the snapshots of the same network resource. Update information may include any content or status information reflecting certain update from the network resource. FIG. 2 further illustrates details of the dynamic monitoring process consistent with the disclosed embodiments.

As shown in FIG. 2, system 300 or the browser (e.g., dynamic monitoring module 410) may take consecutive snapshots of a same network resource (201). That is, the browser obtains the contents of the network resource at a certain point or points of time. Further, the browser may be triggered to take consecutive snapshots of the same network resource by a triggering mechanism. The triggering mechanisms may include any appropriate ways to trigger the browser to take the snapshots. For example, the triggering mechanisms may include a periodic trigger and an immediate trigger.

A periodic trigger may use a preset time interval to periodically trigger the browser to take the consecutive snapshots of the network resource. The time interval may be set uniformly within the system (e.g., the browser) for all network resources to be dynamically monitored, or may be set separately within the system for the network resources to be dynamically monitored based on attributes of individual network resources. Further, the time interval can also be set by users according to their preferences.

On the other hand, the immediate trigger may be set according to one or more updating instructions from the user. The updating instructions may include one or more of: instructions opening the browser by the user, instructions closing the browser by the user, and/or instructions using the browser by the user, etc. Instructions using the browser may include: opening the menu bar, the sidebar; opening history, the most frequently visited record, the most recently visited record; opening the favorites folder; opening the address bar drop-down list; and opening the network resource dynamically monitored, etc. Thus, under different trigger mechanisms, separately or in combination, the browser (e.g., dynamic monitoring module 310 or 410) may periodically take the consecutive snapshots of the same network resource based on the preset time interval, or may take the consecutive snapshots of the same network resource based on the updating instructions from the user.

After taking the snapshots (201), the browser may capture the specific contents of the network resource (202). For example, document object model or other models with similar features based on HTML source code of the network resources, or the HTML source code directly, may be used to capture specific contents of the network resources. Further, various ways may be used to capture the specific contents of the network resources. For example, the specific contents may be captured through specific areas of the network resources, or may be captured through specific elements of the network resources.

More specifically, obtaining the specific areas through the document object model may be realized in various ways. The specific areas of network resources can be obtained through certain specific-area determination methods, or can be obtained through a user-defined method. Further, the browser may determine whether there is a user-defined method to obtain the specific areas. If there is a user-defined method, the specific areas of the network resource are obtained using the user-defined method; if there is no user-defined method, the specific areas of the network resources are then obtained through the certain specific-area determination methods. Additionally, the browser may first determine whether there is a user-defined method to obtain the specific areas. If there is a user-defined method, the specific areas of the network resource are obtained using the user-defined method; if there is no user-defined method, the browser may search a database to find specific areas matching the URL of the network resources. If specific areas matching the URL of the network resources cannot be found, the specific areas of the network resources are then obtained through the certain specific-area determination methods.

Obtaining the specific elements can also be realized in various ways. For example, the specific elements may be obtained through the document object model. More specifically, obtaining the specific elements of the network resource through the document object model may include: obtaining coordinates of elements of the network resource as identified by the user; marking the obtained coordinates in the document object model of the network resource; and finding the specific elements of the network resources through node information in the marked document object model. Further, the specific elements can also be searched based on the ID, name, or style of the elements of the network resource as specified by the user. More particularly, the ID, name, or style (e.g., bold font, color, etc.) of a specific element is first obtained using a system function, and the specific element and other attributes, such as text, size, width, and height, etc. (not all specific elements have such attribute information, and even when a specific element has multiple attributes, only the attributes interested by the user need to be obtained), can be obtained based on the ID, name, or style of the specific element. Further, the ID and attribute information of the specific element can be saved. Of course, the system can also automatically analyze the specific elements of network resources.

Further, the browser may compare the captured specific contents of two consecutive snapshots of the network resource (203). For example, the browser may compare the specific contents of two consecutive snapshots of the network resource based on the HTML source code of the network resource. Or the specific contents of two consecutive snapshots of the network resource are compared based on the corresponding document object model of the network resource.

Returning to FIG. 1, by taking snapshots of the network resources and comparing the captured specific contents of the snapshots of the network resource, the browser may dynamically monitors update information of the network resource (101). Further, as previously explained, the network resource (s) to be dynamically monitored may be identified by the browser (e.g., identification unit 411).

The browser may identify the network resources to be dynamically monitored based on one or more instructions specifying network resources need to be dynamically monitored received from the user or to identify the network resources to be monitored based on analysis using preset rules. The identified network resources may be from multiple sources instead of from a single list (e.g., an RSS list) and/or be stored in different places within the browser. For example, the identified network resources to be dynamically monitored may be included in the browser's favorites folder, in the browser's address-bar drop-down list, and/or in the web addresses entered into the browser's address bar, etc.

Thus, the browser may dynamically monitor update information of the network resources that need to be dynamically monitored listed in the browser's favorites folder; dynamically monitor update information of the network resources that need to be dynamically monitored listed in the browser's address bar drop-down list; and/or dynamically monitor update information of the network resources that need to be dynamically monitored pointed to by a web address entered in the browser's address bar. In other words, the browser may by default treat all the network resources listed in the favorites folder or in the address bar as the network resources to be dynamically monitored, or the browser (e.g., identification unit 411) may determine network resources to be dynamically monitored based on received one or more user instructions, such as prompting the user when the user is storing a network resource into the favorites folder for the user to choose whether to specify this network resource as a network resource to be dynamically monitored. In addition, based on one or more preset rules, the browser can also automatically analyze the favorites folder and the address bar to determine which network resources to be dynamically monitored, such as web pages of blogs. The browser will then dynamically monitor the determined network resources. When any update in any of these network resources reaches a predetermined condition (the predetermined condition may be set by the browser or set by users), the user can be notified or prompted. That is, various specific ways may be used to determine which network resources to be dynamically monitored by the browser for changes in contents, and to notify the user when the predetermined notification condition is met.

Further, if there is any update from the monitored network resource(s), the browser (e.g., update notification module 420) may notify the user according to a preset notification means (102). In certain embodiments, when there is any update from the monitored network resource, the browser may further determine whether the corresponding update information meets a pre-determined update notification condition set through, for example, the first presetting unit 421.

If the update information meets the condition, the user is notified according to a preset notification means set through, for example, the second presetting unit 422. Otherwise, the user is not notified. Of course, the further determination may be omitted and, as long as there is any update from the monitored network resources, the user is notified according to the preset notification means no matter what the update is.

The update notification condition may include one or more of: the total number of changed words in the network resource exceeds a certain threshold value, the changed portion in the network resource contains picture(s) (picture changes), the changed portion in the network resource contains link(s) (link changes), the changed portion in the network resource contains key word(s), the changed portion in the network resource contains multi-media file(s), and/or the changed portion in the network resource contains downloadable file(s) (such as RAR files, etc.), etc.

In addition, the update notification means may be set by the browser automatically, or may be set by the user through one or more configuration instructions. More particularly, the update notification means can be separated into different categories according to different attributes. The attributes may include: shape, position, content, and effect. The shape may include one or more of dialog boxes, bubbles, and labels. The position may include one or more of: menu bar, side bar, address bar; history, the most frequently visited record, the most recently visited record; the favorites folder; the current page, and a blank page. The content may include one or more of: title, address, introduction, updating time, and invalid web page. The effect may include one or more of: the colors, highlighting, and flashing of texts, and audios.

For example, when the user opens or closes the browser, if there is a change in a webpage that needs to be dynamically monitored, a dialog box can be popped up at any location to indicate a part or entire of the website or webpage has been updated. Further, a notification message inside the dialog box can be just simple texts, such as "updated," more complex texts containing relevant information such as introductions of the updated website(s), or a combination of texts notification and corresponding audio notification.

Also for example, when the user opens the menu bar or the sidebar, or sets options in an option or other column, if there are changes in web pages that need to be dynamically monitored, a bubble can be used at any location to display a part or all of the updated contents. The texts inside the bubble can be different colors, highlighting, flashing, or audio to notify the user with different effects.

Also for example, when the user opens a list of the browser's browsing history, the most frequently visited record, or the most recently visited record, if there are changes in web pages that need to be dynamically monitored, a bubble can be used on the corresponding URL entries to display notification. The contents of the notification can be a part or all of the updated contents, or can be just simple text notification. The updated entries in the list can be displayed with different effects, such as different colors, highlighting, or flashing, to facilitate timely access by the user.

When the user clicks a drop-down list on the address bar, if there are changes in web pages that need to be dynamically monitored, a label can be used on the corresponding URL entries to display notification. Or, when the user opens a web page in the browser, if the web page is one being dynamically monitored and there are changes in the web page, a dialog box, bubble, or label, etc., can be used to notify the user. In other words, the browser may be configured to notify any updates from the network resources to be dynamically monitored according to the sources of the network resources. For example, the notifications may be displayed at the sources of the network resources to be dynamically monitored.

It is understood that the above exemplary notification methods are not exhaustive, those skilled in the art can expand or revise these methods to create other different notification methods, such as by different combinations of attributes. Any method capable of notifying the user that a part or all of the websites or web pages are updated can be one of the notification methods. For example, when opening a web page not currently visible, or on an already-opened web page not currently visible, the browser can notify updated web pages, or jump directly to the front visible area to notify the user. That is, through one or more of dialog boxes, bubbles, labels, and audios, update notification can be provided within the browser interface or within the terminal interface. In addition, the notification methods may also include communication software tools (i.e., third-party tools) to send notification messages to a mobile terminal, such that the user with the mobile terminal can receive update notification even when it is not convenient to sit in front of a computer or other fixed terminals. It should be noted that the third-party tools can include the E-mail, IM and other communication tools. Thus, the update notification means may include any appropriate means to notify the user, including providing update notification within the browser interface through one or more of dialog boxes, bubbles, labels, audios, and other shapes; providing update notification within the terminal interface and in an area outside the browser interface through one or more of dialog boxes, bubbles, labels, audios, and other shapes; and/or sending update notification to mobile terminals through communication software tools.

In addition, it should be noted that, the contents of the notification can be set to all or part of the updated contents, or can be a simple text notification. Updated entries in a list can be displayed using different colors, highlighting, or flashing to facilitate timely access by the user. If there are multiple updated entries, and the user only reads some of the multiple entries, the browser can be configured to notify or not to notify the user those entries unread by the user. For example, if there are 10 updated entries, and the user only reads 9 of them, the user can be notified next time, or the user may be no longer notified.

Further, when the user receives an update notification and clicks on the notification to read, the notification method can further include: receiving the instruction from the user for reading the corresponding network resource; making the display noticeable, such as highlighting, for the specific changed contents of the network resource; and displaying the processed contents of the network resource to the user. More particularly, the making the display noticeable for the specific changed contents of the network resource includes: in case of newly added contents, making display noticeable for the added contents of the network resource; in case of all or part of contents being modified, making display noticeable for the modified contents in the changed network resource (after the modification); and in case of removed contents, making display noticeable for the removed contents of previous network resource (before the removal).

The disclosed systems and methods may provide many advantageous browser and other software applications in a variety of network or client environments, such as in personal computer equipment and the like, mobile phones, mobile communication devices, personal digital assistants (PDAs) and other electronic equipment.

For example, by using various browser-based network resource update notification methods and systems, because web pages are directly monitored through the browser, a variety of web pages, including the ones not supporting RSS output, can be dynamically monitored, and users can be notified actively and timely through multiple ways after the monitored web pages are updated. Thus, when a user uses the browser, the user not only can dynamically monitor his/her interested network resources conveniently, but also can timely read the updated contents of these network resources. Further, when the user is interested in subscribing certain web pages, the user does not need to simultaneously open both RSS reader and a web browser (two client-side tools) in order to subscribe the web pages and read updated contents. Furthermore, the original favorites-folder of the web browser can be used to notify the user of updates from web pages interested by the user, which makes it significantly convenient for the user to use the disclosed methods. In addition, the browser can notify users using multiple ways when the update information from the network resources being dynamically monitored meets certain update-notification conditions. Afterwards, when users read updated network resources, the browser can display the updated contents to the user through many formats to meet the individual needs of users. Moreover, the update notification messages can be sent to mobile terminals using communication software tools, and the user can timely receive update notification even when the user does not sit in front of a computer. Thus, the scope of applications of this invention can be broadened.

In addition, the various functional units in the various embodiments can be integrated in a processing module. Each unit can be a separate physical existence, or two or more units can be integrated into a single module. For example, the updating subsystem and notification subsystem in the embodiments of the invention mentioned above can be used at the browsers' client side as one system, and can also be used as two independent systems at the browser's client side at the same time or at different times to perform their respective functions. The integrated module can be implemented in the form of hardware or in the form of software functional modules. If the integrated module is implemented in the form of software functional modules and is sold or used as an independent product, it can also be stored in a computer-readable storage medium. Other applications and advantages are obvious to those skilled in the art.

What is claimed is:

1. A method for notifying a user of network resource updates for a terminal, implemented by a browser of a user computer, comprising:
    identifying a plurality of network resources from multiple sources to be directly and dynamically monitored on the user computer, wherein the multiple sources include at least:
        network resources listed in the browser's favorites folder;
        network resources listed in the browser's address bar drop-down list; and
        network resources pointed to by a web address entered in the browser's address bar;
    directly and dynamically monitoring the identified network resources by the browser of the user computer based on a trigger mechanism, wherein the trigger mechanism is an immediate trigger mechanism configured to trigger the browser taking consecutive snapshots of a same network resource based on updating instructions from the user;
    determining whether there are updates in the monitored network resources by capturing and comparing a specific element of the same network resource based on document object model of the same network resource by using a process including:
    searching the specific element based on a text style of the specific element of the network resource as specified by the user; and
    when it is determined that there are updates in the monitored network resources, notifying, by the browser of the user computer, the user according to a preset update notification means and the multiple sources of updated network resources.

2. The method according to claim 1, wherein the updating instructions include one or more of:
    instructions opening the browser by the user;
    instructions closing the browser by the user; and
    instructions using the browser by the user.

3. The method according to claim 1, wherein notifying the user further includes:
    determining whether corresponding update information meets a preset update notification condition; and
    when it is determined that the update information meets the preset update notification condition, notifying the user according to the preset update notification means.

4. The method according to claim 3, wherein the preset update notification condition includes one or more of:
    a total number of changed words in a network resource exceeding a certain threshold value;
    a changed portion in the network resource containing a picture;
    the changed portion in the network resource containing a link;
    the changed portion in the network resource containing a key word;
    the changed portion in the network resource containing a multi-media file; and
    the changed portion in the network resource containing a downloadable file.

5. The method according to claim 1, wherein the update means includes at least one of:
    providing update notification within a browser interface through one or more of a dialog box, a bubble, a label, and an audio;
    providing the update notification within a terminal interface and in an area outside the browser interface through one or more of a dialog box, a bubble, a label, and an audio; and
    sending the update notification to a mobile terminal through communication software tools.

6. A user-computer based network resource update notification system for notifying a user of network resource updates for a terminal, implemented by a user computer having a browser, the system comprising:
    a dynamic monitoring module; and
    an update notification module, wherein:
    the dynamic monitoring module is configured to:
        identify a plurality of network resources from multiple sources to be directly and dynamically monitored on the user computer, wherein the multiple sources include at least:
            network resources listed in the browser's favorites folder;
            network resources listed in the browser's address bar drop-down list; and
            network resources pointed to by a web address entered in the browser's address bar;
        directly and dynamically monitor the identified network resources by the browser of the user computer based on a trigger mechanism, wherein the trigger mechanism is an immediate trigger mechanism configured to trigger the browser taking consecutive snapshots of a same network resource based on updating instructions from the user; and
        determine whether there are updates in the monitored network resources by capturing and comparing a specific element of the same network resource based on document object model of the same network resource by using a process including:
        searching the specific element based on a text style of the specific element of the network resource as specified by the user, and
    the update notification module is configured to:
        when the dynamic monitoring module determines that there are updates in the monitored network resources, notify, by the browser of the user computer, the user according to a preset update notification means and the multiple sources of updated network resources.

7. The system according to claim 6, wherein the updating instructions include one or more of:
    instructions opening the browser by the user;
    instructions closing the browser by the user; and
    instructions using the browser by the user.

8. The system according to claim 6, wherein, to notify the user, the update notification module is further configured to:
    determine whether corresponding update information meets a preset update notification condition; and
    when the update notification module determines that the update information meets the preset update notification condition, notify the user according to the preset update notification means.

9. The system according to claim 8, wherein the preset update notification condition includes one or more of:

a total number of changed words in a network resource exceeding a certain threshold value;

a changed portion in the network resource containing a picture;

the changed portion in the network resource containing a link;

the changed portion in the network resource containing a key word;

the changed portion in the network resource containing a multi-media file; and the changed portion in the network resource containing a downloadable file.

10. The system according to claim 6, wherein the update means includes at least one of:

provides update notification within a browser interface through one or more of a dialog box, a bubble, a label, and an audio;

providing the update notification within a terminal interface and in an area outside the browser interface through one or more of a dialog box, a bubble, a label, and an audio; and sending the update notification to a mobile terminal through communication software tools.

11. A non-transitory computer-readable medium containing executable computer programs, when executed by a user computer having a browser, performing a method for notifying a user of network resource updates, wherein the medium is not a signal, the method comprising:

identifying a plurality of network resources from multiple sources to be directly and dynamically monitored on the user computer, wherein the multiple sources include at least:

network resources listed in the browser's favorites folder;

network resources listed in the browser's address bar drop-down list; and network resources pointed to by a web address entered in the browser's address bar;

directly and dynamically monitoring the identified network resources by the browser of the user computer based on a trigger mechanism, wherein the trigger mechanism is an immediate trigger mechanism configured to trigger the browser taking consecutive snapshots of a same network resource based on updating instructions from the user;

determining whether there are updates in the monitored network resources by capturing and comparing a specific element of the same network resource based on document object model of the same network resource by using a process including:

searching the specific element based on a text style of the specific element of the network resource as specified by the user; and when it is determined that there are updates in the monitored network resources, notifying, by the browser of the user computer, the user according to a preset update notification means and the multiple sources of updated network resources.

12. The computer-readable medium according to claim 11, wherein the updating instructions include one or more of:

instructions opening the browser by the user;

instructions closing the browser by the user; and instructions using the browser by the user.

13. The computer-readable medium according to claim 12, wherein the instructions using the browser by the user include one or more of:

opening a menu bar;

opening a sidebar;

opening a history;

opening a most frequently visited record;

opening a most recently visited record;

opening the favorites folder;

opening the address bar drop-down list; and opening any of the network resource directly and dynamically monitored.

* * * * *